(12) United States Patent
Marguerite et al.

(10) Patent No.: US 8,529,718 B2
(45) Date of Patent: Sep. 10, 2013

(54) METHOD FOR MAKING LAMINATED GLAZING AND LAMINATED GLAZING INCLUDING AT LEAST ONE HOLE

(75) Inventors: Cédric Marguerite, Saint Leger aux Bois (FR); Michael Labrot, Aachen (DE)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 13/378,899

(22) PCT Filed: Jun. 18, 2010

(86) PCT No.: PCT/FR2010/051221
§ 371 (c)(1),
(2), (4) Date: Mar. 1, 2012

(87) PCT Pub. No.: WO2010/146318
PCT Pub. Date: Dec. 23, 2010

(65) Prior Publication Data
US 2012/0148798 A1  Jun. 14, 2012

(30) Foreign Application Priority Data
Jun. 19, 2009 (FR) .................................. 09 54167

(51) Int. Cl.
*B29C 65/00* (2006.01)
*B32B 17/00* (2006.01)
*B32B 37/00* (2006.01)
(52) U.S. Cl.
USPC ............................ 156/104; 156/107; 156/286
(58) Field of Classification Search
USPC ................. 156/104, 286, 101, 102, 106, 107; 49/501–505; 296/84.1–96.22; 52/171.3, 52/172, 201, 204.5–204.72, 786.1, 786.11, 52/786.12, 786.13
See application file for complete search history.

(56) References Cited

U.S. PATENT DOCUMENTS

| | | | | |
|---|---|---|---|---|
| 3,281,296 A | * | 10/1966 | Jameson ........................ 156/104 |
| 4,543,283 A | | 9/1985 | Curtze et al. |
| 4,647,327 A | * | 3/1987 | Rase ................................ 156/87 |
| 5,398,452 A | * | 3/1995 | Schilde et al. ................... 49/501 |
| 6,609,350 B1 | * | 8/2003 | Weber ............................ 52/784.1 |
| 2002/0053816 A1 | | 5/2002 | Teschner et al. |
| 2010/0059253 A1 | | 3/2010 | Labrot et al. |

FOREIGN PATENT DOCUMENTS

| | | |
|---|---|---|
| DE | 43 11 442 C1 | 7/1994 |
| DE | 198 49 840 C1 | 2/2000 |
| DE | 102 30 443 A1 | 1/2004 |
| EP | 0 301 419 A2 | 2/1989 |
| FR | 2 569 625 A1 | 3/1986 |
| GB | 2 271 139 A | 4/1994 |
| WO | WO 2008/065310 A1 | 6/2008 |

OTHER PUBLICATIONS

International Search Report issued Oct. 1, 2010 in PCT/FR2010/051221.

* cited by examiner

*Primary Examiner* — Katarzyna Wyrozebski Lee
*Assistant Examiner* — Carson Gross
(74) *Attorney, Agent, or Firm* — Oblon, Spivak, McClelland, Maier & Neustadt, L.L.P.

(57) ABSTRACT

A process for manufacturing a laminated glazing including a hole of substantial size, the process arranging a seal on an edge face and external faces of the glazing around an entire periphery of the hole, the seal including protruding fastening elements that are applied against the external faces of the glazing.

8 Claims, 1 Drawing Sheet

METHOD FOR MAKING LAMINATED GLAZING AND LAMINATED GLAZING INCLUDING AT LEAST ONE HOLE

The invention relates to a process for manufacturing a laminated glazing unit comprising at least two glass substrates joined by an interlayer comprising at least one thermoplastic sheet, especially based on polyvinyl butyral (PVB), this glazing unit being provided with at least one hole.

Laminated glazing units are generally used to provide, by virtue of the thermoplastic interlayer, one or more combined functionalities, such as safety, in particular for the windshields of vehicles, by holding shards of glass in place if the glazing unit is broken, antitheft, noise reduction (soundproofing) or even filtering, in particular of ultraviolet radiation.

It may be useful, in certain applications, for the laminated glazing units to be provided, at the end of the manufacturing process, with one or more through-holes, i.e. at least one hole arranged right through the thickness of the glazing unit. The hole is generally small so as to correspond for example to an orifice for passing a retaining or fixing element, such as a screw, therethrough.

Currently such holes in laminated glazing units are produced small, current manufacturing processes not allowing through-orifices of substantial size to be produced in laminated glazing.

Conventionally, processes for manufacturing laminated glazing consist in superposing the glass sheets and the thermoplastic interlayer and joining them in an oven. However, it is essential, before the final bonding of the interlayer to the glass sheets, to degas the glass sheets and the interlayer, i.e. to remove air trapped between the glass sheets and the interlayer, and moreover to prevent any penetration of air during the final baking operation.

Degassing is carried out in various ways depending on the process used. It is for example carried out in a preheating oven by calender rollers that press the glass sheet against the interlayer the sheet. As a variant, degassing is obtained by placing a peripheral seal on the edge face of the glazing, this seal being connected to a vacuum pump and possessing a continuous groove running around the circumference of the glazing, facing the interlayer and opening into the pump. Air that is trapped between the glass sheets and the interlayer is then removed, by virtue of the vacuum pump, via the groove of the seal. During this pumping operation, the glazing is preheated in an oven.

It is essential to ensure perfect degassing, as otherwise, during the bake, the pressure exerted on the glazing may cause bubbling (pockets of air localized at the glass/interlayer interface) or even breakage of the glazing.

Since the degassing operation is delicate, it has to the present day never been envisaged to produce a glazing unit in which the glass sheets and the interlayer are pierced beforehand and then joined so as to form a laminated glazing unit provided with a through-hole of substantial size.

However, it is now desirable to produce pierced laminated glazing units the hole of which is sufficiently large for the application concerned.

The object of the invention is therefore to provide a manufacturing process allowing, simply and without requiring modification of the main steps of the process, a laminated glazing unit provided with at least one through-hole of substantial size to be produced.

According to the invention, the process for manufacturing a laminated glazing unit comprising at least two glass substrates and at least one plastic interlayer arranged over the largest dimensions of the substrates, and provided with at least one hole through the thickness of the glazing, comprises a step of superposing the substrates and the interlayer, the substrates and the interlayer having been cut beforehand so as to have respective apertures of which the superposition corresponds to said hole in the glazing unit, and a degassing step, and is characterized in that it comprises, before the degassing step, a step of affixing a removable seal, around the periphery of said hole, to the edge face of the glazing unit and to the general external faces of the glass substrates, the seal comprising a web and, connected to this web, two opposed flanges extending in parallel in the same direction and spaced so as to house the thickness of the glazing, the flanges having respective mutually facing internal faces which are each provided with at least one protruding fastening element, and are respectively pressed against the general external faces of the substrates, whereas the web is provided, on its internal face connecting the internal faces of the flanges, with at least one groove arranged opposite the edge face of the glazing unit.

The term "degassing" is understood to mean an operation that ensures that air is removed from between the substrates and the interlayer.

The term "external" is understood, in the rest of the description, to mean facing the environment outside the element to which it relates.

The term "internal" relates to a part turned toward the interior of the element to which it relates.

Thus, a specific seal is placed on the periphery of the hole. Its groove is intended to allow air to be removed in the degassing step. Furthermore, the protruding fastening elements arranged on the internal faces of the flanges, by being pressed against the external faces of the glazing, allow the seal to be held firmly in place on the glazing without additional fastening means being required, in particular before the degassing step has begun. Specifically, it is above all necessary to seat the seal around the hole of the glazing so as to connect the glazing with the degassing device simply and without stress—because once the pumping has started the seal will remain in place.

The seal may be easily removed, once a baking step has completed the manufacturing process, because it is not rigidly connected to the glazing.

Advantageously, the one or more protruding fastening elements of a flange of the seal are inclined toward the web, in order to oppose the forces acting to tear off the seal when the latter is positioned on the glazing.

If each flange of the seal comprises only a single fastening element, the latter is preferably located near the distal end of the flange, at the opposite end to the web.

According to one feature, the distance separating the flanges of the seal is smaller than the thickness of the glazing, thereby contributing to the compression of the seal against the external faces of the glazing.

According to another feature, the seal is extruded and made of a flexible material of the ethylene-propylene-diene monomer (EPDM) type. The elasticity of the material thus allows expansion of the housing space left between the flanges of the seal and makes mounting of said seal on the glazing easy, so that the seal is then clamped and compressed against the glazing.

In order to provide a sufficient area for the seal to adhere to the glazing, while additionally not being so large that handling of the glazing becomes awkward, the flanges of the seal cover the external faces of the substrates over a width, in a direction away from the hole, of at least 8 mm, preferably from 8 to 15 mm.

The groove of the seal is preferably unitary and extends over the entire length of the seal. The groove is locally connected in one or more locations to a gas extraction device, of the vacuum pump type, so as to ensure the degassing step.

With a view to complete degassing, an additional seal of the known type is placed around the entire external periphery of the glazing unit, this seal being connected to a gas extraction device, of the vacuum pump type, the latter device possibly being connected to the other seal.

The process of the invention provides a glazing unit with a hole the size of which will be suited to the particular application of the glazing unit.

The invention also relates to a laminated glazing unit comprising at least two glass substrates and at least one plastic interlayer arranged between the substrates, and provided through its thickness with at least one hole of substantial size, which size makes it possible to house a functional element other than a retaining or fixing element, such as one for receiving a window vent, or to form an openable space in an automotive glazing unit of the sunroof type, this hole being in particular intended to cooperate with a movable glass panel.

The present invention will now be described using merely illustrative examples that in no way limit the scope of the invention, and by way of the appended illustrations, in which:

FIG. 1 illustrates a laminated glazing unit 1 which is associated with a device ensuring implementation of one of the steps of the manufacturing process of the invention, i.e. the degassing.

The laminated glazing unit 1 is for example intended to form the openable roof of an automotive vehicle. It comprises a hole 2 intended to form the opening in the roof and to be closed, in this particular application, by appropriate movable closing means (not illustrated).

The hole is of substantial size, especially larger than 100 cm$^2$, such as in the present application, in particular of about 0.4 m$^2$.

Figure 2:
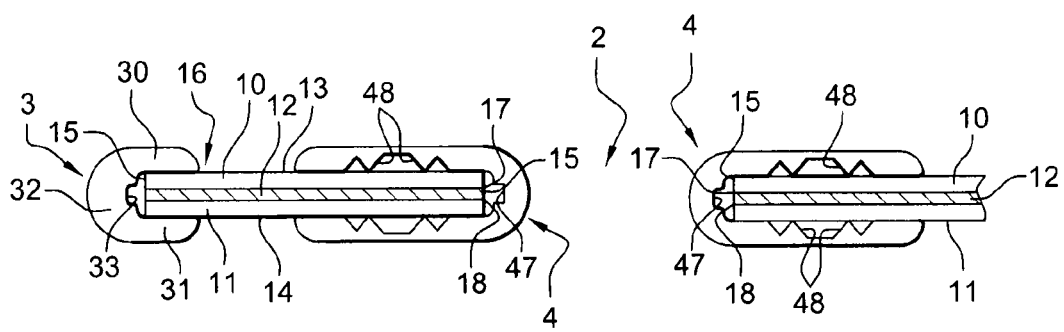
FIG. 2 is a partial cross-sectional view of FIG. 1 through the thickness of the glazing unit and illustrating a specific seal used in the implementation of the process of the invention.

The laminated glazing unit, a partial cross-sectional view of which is illustrated in FIG. 2, comprises at least two glass sheets or substrates 10 and 11, and an interlayer or intermediate sheet 12 arranged between said glass sheets.

The process for manufacturing the glazing unit comprises various steps that will be described in succession.

A preliminary step consists in providing two glass sheets 10 and 11 that have been cut beforehand using a conventional glass-cutting process so as to produce openings having the dimensions of the hole 2, and an interlayer 12 also cut beforehand by any conventional means for cutting a plastic sheet so as to provide an opening corresponding to said hole 2.

The cut glass sheets 10 and 11 and cut interlayer 12 are superposed in order to form a laminated assembly with external faces 13 and 14 and edge face 15. The step of associating the glass sheets and the interlayer is known per se and is not described here.

A peripheral seal 3 is removably placed around the entire external circumference 16 of the glazing. This seal, conventionally used in the manufacture of unapertured laminated glazing, is generally U-shaped, the flanges 30 and 31 of the U, the surface of which is substantially smooth, being pressed against the external faces, respectively 13 and 14, of the glass sheets, the web or base 32 of the U being arranged against the edge face 15 of the glazing.

The seal 3, made of a flexible material, for example EPDM, is retained on the glazing by simple elastic pressure. Since it is on the external circumference of the glazing, there is no need for specific retention means.

The seal 3 is provided in a known manner with a peripheral groove 33 located at the base of the U and placed facing the edge face 15 of the glazing. This groove is connected, in at least one location on the glazing, to a gas extraction device 5 as illustrated schematically in FIG. 1.

Figure 3:
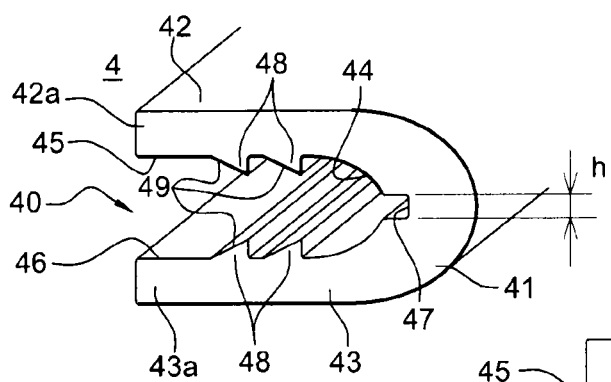
FIG. 3 is a perspective view of a variant embodiment of the particular seal of the invention.
Figure 4:
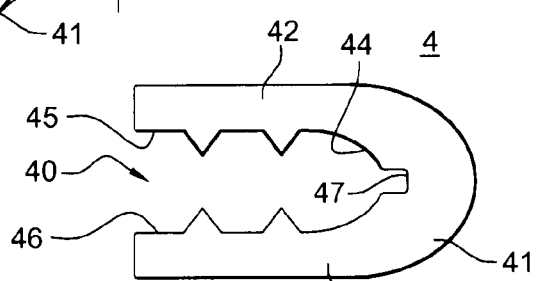
FIG. 4 is a cross-sectional view of another variant embodiment of the seal.
Figure 5:
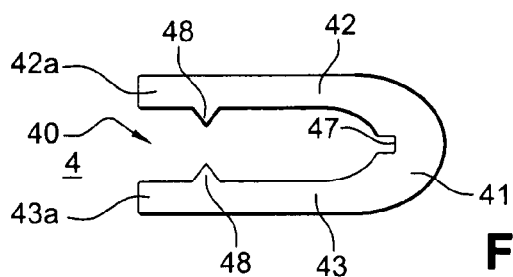
FIG. 5 is a cross-sectional view of yet another variant embodiment of the seal

According to the invention, the manufacturing process includes placing another removable seal 4 on the periphery of the hole 2. FIG. 2 illustrates this seal in place on the glazing. FIGS. 3 to 5 are variant embodiments of this seal.

The seal 4 is approximately U-shaped. It comprises an opening 40 bounded by a web 41 and spaced-apart, mutually-facing flanges 42 and 43 having respective internal faces 44 for the web and 45 and 46 for the flanges. The seal is fitted via its opening 40 onto the edge face 15 of the glazing defining the hole 2 (FIG. 2).

It is made of a flexible elastic material of the EPDM type, preferably by extrusion.

The internal face 44 of the web of the U comprises a groove 47 which extends over the entire length of the seal. The groove is preferably centered in the base of the U so as to be placed opposite the edge face of the interlayer 12 of the glazing unit (FIG. 2). It has a height h that is preferably greater than the thickness of the interlayer 12 so as to be arranged facing the interfaces 17 and 18 of the glass sheets and interlayer.

The internal faces 45 and 46 of the flanges each have at least one protruding element 48 serving as means for fastening and holding the seal in place against the external faces 10 and 11 of the glazing.

The seal 4 acts as a jaw that can be sufficiently opened, by virtue of its flexibility, and then fitted to the edge face 15 of the glazing bounding the hole 2, and which, once closed against the external faces 10 and 11 of the glazing, remains held firmly in place by virtue of its protruding elements 48.

The protruding element 48 preferably extends over the entire length of the seal when the latter is obtained by extrusion.

The element 48 of the variant in FIG. 3 is preferably inclined, the incline 49 starting from the internal face of the flange and being directed toward the groove 47, i.e. in a direction away from the opening 40 of the seal. Thus, when the seal is fitted around the hole 2, the element opposes, via its incline 49, the forces acting to tear off the seal.

In the examples shown in FIGS. 2 to 4, the seal 4 comprises on each of its flanges two protruding fastening elements 48 that are centered on the distance separating the web 41 and the free, distal end 42a or 43a of each of the flanges. Each web could comprise only a single protruding element, such as illustrated in FIG. 5, which would then preferably be arranged near the free, distal end 42a or 43a of the flange. In yet another variant, more than two retaining elements could be provided.

Figure 1:
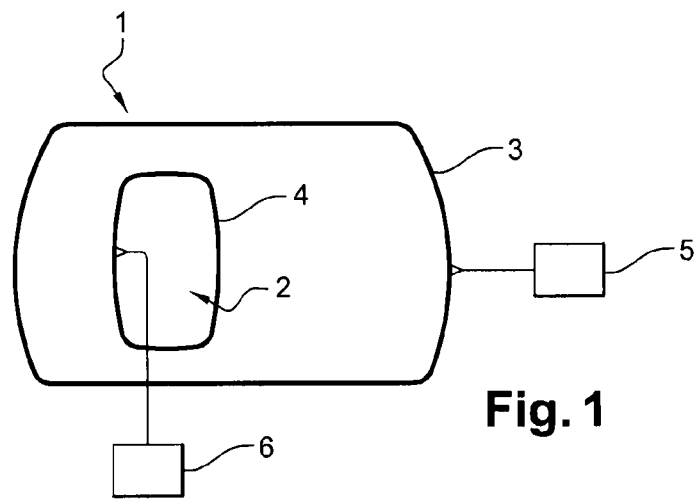
FIG. 1 shows a schematic top view of a laminated glazing unit associated with the device for implementing part of the process of the invention.

When the joint is fitted, the groove 47 is connected, in at least one location on the circumference of the hole 2, to a gas extraction device 6, as illustrated schematically in FIG. 1.

It is possible to provide several pumping locations on the perimeter of the seal 4 depending on the size of the hole.

The extraction devices 5 and 6, which could be combined into a single device, are used to ensure the evacuation of air from between the glass sheets and the interlayer.

Once the degassing has been carried out, the glazing assembly is passed in a known manner into an oven so as to join the glass sheets with the interlayer. It may be envisioned, during the degassing, to start heating the glazing assembly at the same time.

After the assembly has been joined, the seals 3 and 4 are removed.

Therefore, the process of the invention, by obtaining a hole in the glass sheets and interlayer of the glazing, and by using a seal around the hole of the glazing, makes it possible, by virtue furthermore of the particular features of this specific seal, to provide, simply and without substantial additional cost relative to the process for manufacturing an unapertured glazing unit, a laminated glazing unit with a hole of substantial size, with a view to completely novel applications such as an openable glass vehicle roof, in particular for an automobile.

The invention claimed is:

1. A process for manufacturing a laminated glazing unit including at least two glass substrates and at least one plastic interlayer arranged over largest dimensions of the substrates, and including at least one hole through the thickness of the glazing, the process comprising:
    superposing the substrates and the interlayer, the substrates and the interlayer having been cut beforehand so as to have respective apertures of which the superposition corresponds to the hole in the glazing unit;
    degassing; and
    wherein before the degassing, affixing a removable seal, around the periphery of the hole, to an edge face of the glazing unit and to general external faces of the glass substrates, the seal including a web and, connected to this web, two opposed flanges extending in parallel in a same direction and spaced so as to house the thickness of the glazing, the flanges having respective mutually facing internal faces, which each include at least one protruding fastening element and respectively pressed against the general external faces of the substrates, wherein the web includes, on its internal face connecting internal faces of the flanges, at least one groove arranged opposite the edge face of the glazing unit.

2. The process as claimed in claim 1, wherein the one or more protruding fastening elements of the flange of the seal are inclined toward the web.

3. The process as claimed in claim 1, wherein each flange of the seal includes a single fastening element located near the distal end of the flange, at the opposite end to the web.

4. The process as claimed in claim 1, wherein the distance separating the flanges of the seal is smaller than the thickness of the glazing.

5. The process as claimed in claim 1, wherein the seal is extruded and made of a flexible material of ethylene-propylene-diene monomer (EPDM) type.

6. The process as claimed in claim 1, wherein the flanges of the seal cover the external faces of the substrates over a width, in a direction away from the hole, of at least 8 mm.

7. The process as claimed in claim 1, wherein the groove of the seal is locally connected to a gas extraction device, of vacuum pump type, so as to ensure the degassing.

8. The process as claimed in claim 1, wherein an additional seal is placed around the entire external periphery of the glazing unit, the additional seal being connected to a gas extraction device, of vacuum pump type.

* * * * *